(12) United States Patent
Bratkovski

(10) Patent No.: US 7,515,330 B2
(45) Date of Patent: Apr. 7, 2009

(54) METAMATERIAL STRUCTURES FOR LIGHT PROCESSING AND METHOD OF PROCESSING LIGHT

(75) Inventor: Alexandre M. Bratkovski, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/699,500

(22) Filed: Jan. 30, 2007

(65) Prior Publication Data

US 2008/0180786 A1 Jul. 31, 2008

(51) Int. Cl.
*G02F 2/02* (2006.01)
(52) U.S. Cl. ..................... 359/328; 359/326
(58) Field of Classification Search ............. 359/326, 359/328
See application file for complete search history.

(56) References Cited

U.S. PATENT DOCUMENTS

| | | | |
|---|---|---|---|
| 5,230,029 A * | 7/1993 | Mendenhall et al. ...... 385/27 |
| 6,859,114 B2 | 2/2005 | Eleftheriades et al. | |
| 2003/0223721 A1 | 12/2003 | Povinelli et al. | |
| 2006/0131695 A1 * | 6/2006 | Kuekes et al. ............. 257/618 |

OTHER PUBLICATIONS

Maier, Stefan A., et al., "Experimental demonstration of fiber-accessible metal nanoparticle plasmon waveguides for planar energy guiding and sensing." Applied Physics Letters 86, 071103, (2005), American Institute of Physics, pp. 1-3.
Maier, Stefan A., et al., "Low-loss fiber accessible plasmon waveguide for planar energy guiding and sensing." Applied Physics Letters, vol. 84, No. 20, May 17, 2004, American Institute of Physics, pp. 3990-3992.
Barclay, Paul E., et al., "Nonlinear absorption and dispersion in fiber-taper-coupled silicon photonic crystal microresonators." arXiv:physics/0412002, v. 1, Dec. 1, 2004, pp. 1-11.
Pope, M., et al., "Electronic Processes in Organic Crystals and Polymers," 2nd edition, Oxford University Press, New York, 1999, pp. 1138-1171.
Pendry, J, B, et al-"Magnetism From Conductors and Enhanced NonLinear Phenomena"-IEEE Transactions on Microwave Theory & Techniques vol. 47 Issue Nov. 11, 1999-pp. 2076-2084.

* cited by examiner

*Primary Examiner*—Jennifer Doan

(57) ABSTRACT

A metamaterial structure for light processing includes a light guide and a composite resonant electromagnetic (EM) structure having a resonant frequency. The composite resonant EM structure is arranged to interact with light propagating along the light guide to upconvert a frequency of the light to the resonant frequency, which generates second and higher harmonics of the light frequency. Method of processing light are also disclosed.

20 Claims, 4 Drawing Sheets

US 7,515,330 B2

METAMATERIAL STRUCTURES FOR LIGHT PROCESSING AND METHOD OF PROCESSING LIGHT

BACKGROUND

In light processing systems, crystals of non-linear materials can be used to change the frequency, and thus also the wavelength, of light to produce light of a desired frequency. For example, crystals can be used as a frequency doubler to double the frequency, and halve the wavelength, of light incident on the crystal. This process is called second harmonic generation. In such crystals, the second harmonic conversion efficiency is low at low incident light intensities, but increases with increasing incident light intensity. However, the efficiency of such second harmonic generation processes is typically low.

Accordingly, it would be desirable to provide light processing systems and methods that are able to produce efficient high harmonic conversion.

SUMMARY

An exemplary embodiment of a metamaterial structure for light processing comprises a light guide; and a composite resonant electromagnetic (EM) structure having a resonant frequency, $\omega_R$, the composite resonant EM structure positioned to interact with light propagating along the light guide to upconvert a frequency, $\omega$, of the light to $\omega_R$, which generates second and/or higher harmonics of $\omega$.

Another exemplary embodiment of a metamaterial structure for light processing comprises a first light guide; a second light guide; a third light guide; a first composite resonant electromagnetic (EM) structure having a first resonant frequency, $\omega_{R1}$, the first composite resonant EM structure positioned to interact with light propagating along the first light guide to upconvert a frequency, $\omega_1$, of the light to $\omega_{R1}$, which generates second and/or higher harmonics of $\omega_1$; a second composite resonant electromagnetic structure having a second resonant frequency, $\omega_{R2}$, the second composite resonant EM structure positioned to interact with light propagating along the second light guide to upconvert a frequency, $\omega_2$, of the light to $\omega_{R2}$, which generates second and/or higher harmonics of $\omega_2$; and a third composite resonant electromagnetic structure having a third resonant frequency, $\omega_{R3}$, the third composite resonant EM structure positioned to interact with light propagating along the third light guide to upconvert a frequency, $\omega_3$, of the light to $\omega_{R3}$, which generates second and/or higher harmonics of $\omega_3$.

An exemplary embodiment of a method of processing light with a metamaterial structure comprises propagating light along a first light guide extending through a first composite resonant electromagnetic (EM) structure having a first resonant frequency, $\omega_{R1}$, the first composite resonant EM structure interacts with light propagating along the first light guide to upconvert a frequency, $\omega_1$, of the light to $\omega_{R1}$, which generates second and/or higher harmonics of $\omega_1$.

DRAWINGS

DETAILED DESCRIPTION

Figure 1:
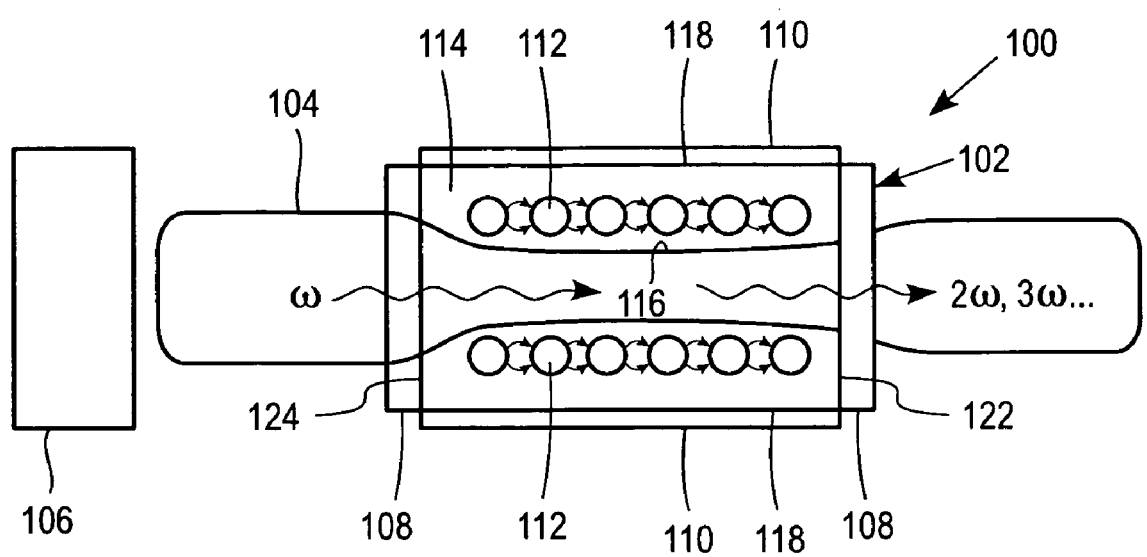
FIG. 1 illustrates an exemplary embodiment of a light processing system including a metamaterial structure.

An exemplary embodiment of a metamaterial structure 100 is shown in FIG. 1. The metamaterial structure 100 comprises a composite resonant electromagnetic (EM) structure 102 arranged along a light guide 104. As shown, the metamaterial structure 100 is provided in a light processing system also including a light source 106. The light source 106 is arranged to emit light into the light guide 104. Depending on the type of the light source 106, the light can be monochromatic (e.g., laser light) and contain substantially only a single frequency, or the light can contain a range of frequencies (e.g., broadband light). The light propagates along the light guide 104 and interacts with the composite resonant EM structure 102. Optional resonators 108 are provided at opposed ends of the composite resonant EM structure 102. An optional outer cladding 110 surrounds the composite resonant EM structure 102.

The composite resonant EM structure 102 has an inherent resonant frequency, $\omega_R$. The composite resonant EM structure 102 upconverts a frequency of the incident light, $\omega$, to the resonant frequency, $\omega_R$. This upconversion process generates harmonics of the incident light. The harmonics can be second and/or higher harmonics. The light frequency, $\omega$, that is converted by the composite resonant EM structure 102 can be a frequency contained within a range of frequencies emitted by a broadband light source, or the single frequency emitted by a monochromatic light source.

Embodiments of the composite resonant EM structures comprise a resonant periodic metamaterial structure. In the embodiment shown in FIG. 1, the composite resonant EM structure 102 comprises metal nanoresonators 112 arranged along at least a portion of the length of the light guide 104. The nanoresonators 112 produce a high electric field, thereby causing a non-linear response of the composite resonant EM structure 102.

In the embodiment shown in FIG. 1, the metal nanoresonators 112 are nano-sized particles. The nano-sized particles can be composed of any metal that provides a sufficiently-high electrical conductivity. The metal preferably has a high conductivity (low resistivity) so that losses can be minimized. For example, the metal can have a low resistivity of less than about 5 µΩ·cm, such as about 4 µΩ·cm, 3 µΩ·cm, 2 µΩ·cm, or 1 µΩ·cm. The metal can be Ag, Au, Al or Cu, or alloys thereof, for example. The nano-sized particles can also be composed of semiconductor materials, such as silicon, or non-metallic materials, such as carbon nano-tubes. The nano-sized particles can be single crystals to eliminate grain boundary effects.

The nano-sized particles shown in FIG. 1 are spherical shaped. In other embodiments, the nano-sized particles can have other forms, such as tubes, fibers, wires, plates, rods and rings. The nano-sized particles can have a maximum dimension (e.g., diameter or length) of about 10 nm to about 200 nm, for example.

The nano-sized particles can be made by any suitable technique. For example, the nano-sized particles can be made by nucleation and growth, precipitation, laser ablation, surfactant-assisted growth, electrochemical synthesis, chemical vapor nucleation, electron beam evaporation or photolithography techniques. The specific technique that is used to form the nano-sized particles is dependent on the desired composition, shape and/or size of the nano-sized particles.

In the embodiment, the nanoresonators 112 are embedded in a non-linear medium 114. The non-linear medium 114 encircles a tapered portion 116 of the light guide 104, and the nanoresonators 112 are positioned along the tapered portion 116. The non-linear medium 114 is an electrical insulator composed of an organic material, inorganic material or mixtures thereof. For example, the non-linear medium 114 can be a ceramic material, or a polymer, such as a plastic, polymethyl methacrylate (PMMA), or a polyester. The non-linear medium 114 can be formed around the light guide 104 by any suitable process, such as molding. Alternatively, the non-linear medium can be wrapped around the light guide 104. In the embodiment, the non-linear medium 114 has a generally cylindrical configuration with an outer surface 118. In other embodiments, the non-linear medium 114 can have other outer surface shapes, such as square, rectangular, triangular and the like.

As shown in FIG. 1, the nanoresonators 112 are positioned along the axial direction (length) of the composite resonant EM structure 102 in the form of a plasmonic waveguide. The arrows between the nanoresonators indicate electric field effects. The nanoresonators 112 can be substantially equally spaced along the axial direction of the composite resonant EM structure 102. The nanoresonators 112 can be spaced from the outer surface of the light guide 104 by a distance of about 25 µm to about 100 µm. The number of nanoresonators 112 along the axial direction of the composite resonant EM structure 102 can be from about 5 to about 100 or more. The nanoresonators 112 can be substantially linearly aligned with each other. The nanoresonators 112 are also arranged circumferentially around the light guide 104. For example, groups of the nanoresonators 112 forming plasmonic waveguides can be circumferentially spaced from each by any suitable angle, such as about 30°, 60° or 90° about the circumference of the light guide 104.

Figure 2:
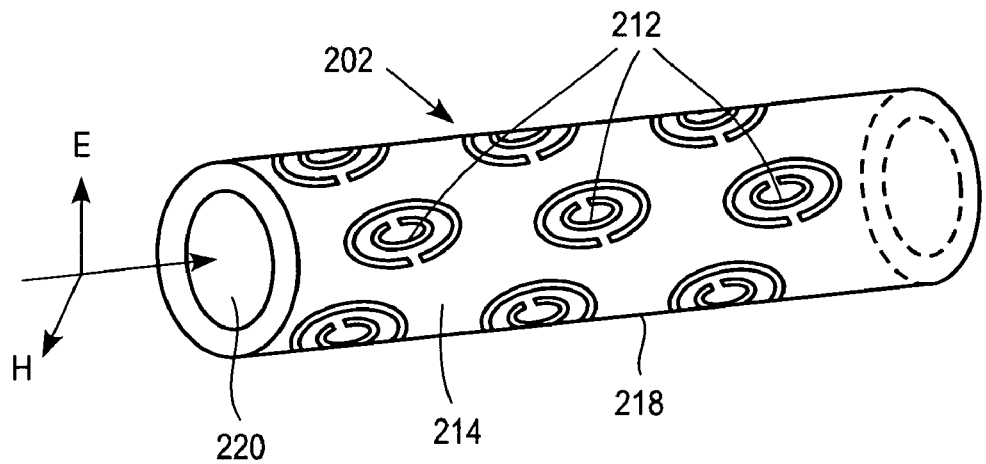
FIG. 2 illustrates another exemplary embodiment of a metamaterial structure including split-ring resonators.

In other embodiments, the resonant periodic metamaterial structure can include nanoresonators provided on the inner surface, and/or outer surface of the non-linear medium. For example, FIG. 2 shows another embodiment of the composite resonant EM structure 202 having nanoresonators 212 (split-rings) provided on the outer surface 218 of the non-linear medium 214. The direction of the electric field, E, and the magnetic field, H, of the light is indicated. The nanoresonators 212 can be formed on the outer surface 218 by various techniques, including by printing on a polymer (e.g., plastic) by nanoimprint lithography (NIL), dry etching, and by transfer to fiber in a roll-to-roll process. The non-linear medium 214 has a cylindrical configuration. In FIG. 2, the light guide, which extends through the cavity 220, is not shown for simplicity. The composite resonant EM structure 202 can be arranged on a light guide, such as light guide 104 shown in FIG. 1, so as to encircle a tapered portion of the light guide, with the nanoresonators 212 positioned along the tapered portion.

Figure 3:
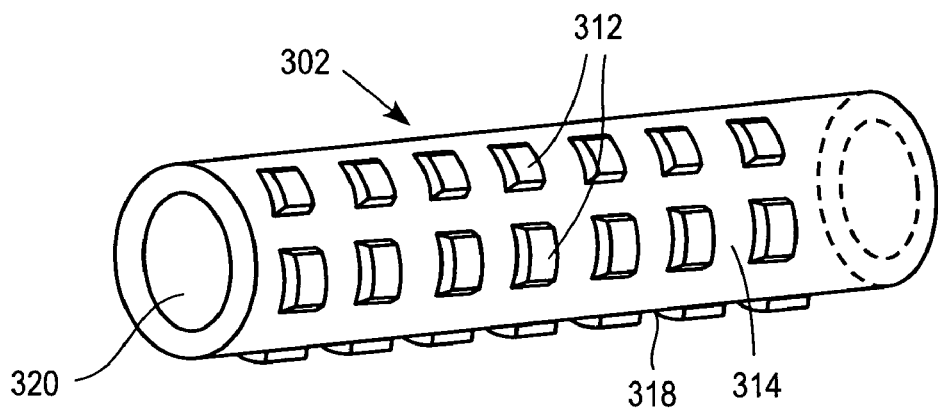
FIG. 3 illustrates another exemplary embodiment of a metamaterial structure including printed nanoresonators.

FIG. 3 shows another exemplary embodiment of the composite resonant EM structure 302 in which nanoresonators 312 (nano-rods) are provided on the outer surface 318 of the non-linear medium 302 to form a resonant periodic metamaterial structure. In this embodiment, the nanoresonators 312 are printed on the outer surface 318, such as by nanoimprint lithography. The non-linear medium 314 can be composed, for example, of any suitable polymer material on which printing can be performed. The non-linear medium 314 can be in sheet form. After the nano-resonators 312 are printed on the non-linear medium 314, the sheet can be rolled to form the desired configuration of the composite resonant EM structure 302. The non-linear medium 314 has a cylindrical configuration. In FIG. 3, the light guide, which extends through the cavity 320, is not shown for simplicity. The composite resonant EM structure 302 can be arranged on a light guide, such as light guide 104 shown in FIG. 1, so as to encircle a tapered portion of the light guide, with the nanoresonators 312 positioned along the tapered portion.

Figure 4:
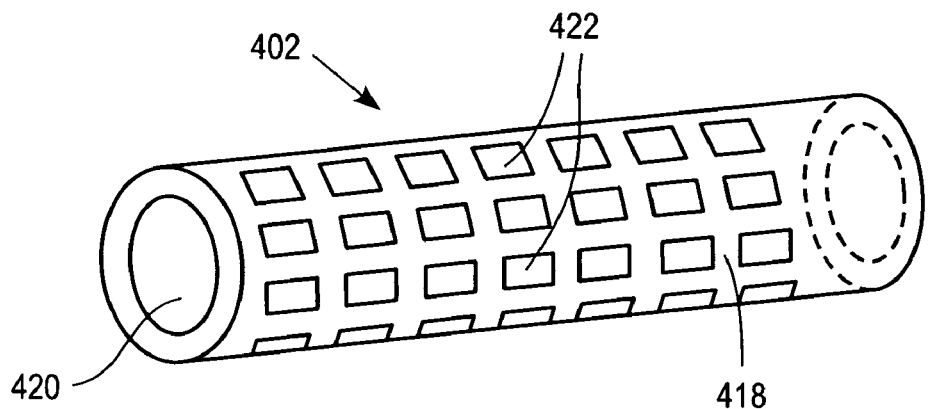
FIG. 4 illustrates another exemplary embodiment of a metamaterial structure having a periodic arrangement of holes.

FIG. 4 shows another exemplary embodiment of the composite resonant EM structure 402 having a latticed or "fishnet" structure with an outer surface 418 and an axially-extending cavity 420. As shown in FIG. 4, the fishnet structure comprises a periodic array of holes 422 extending around the circumference and along the length of the composite resonant EM structure 402. The composite resonant EM structure 402 can be arranged on a light guide, such as light guide 104 shown in FIG. 1, so as to encircle a tapered portion of the light guide.

Figure 5:
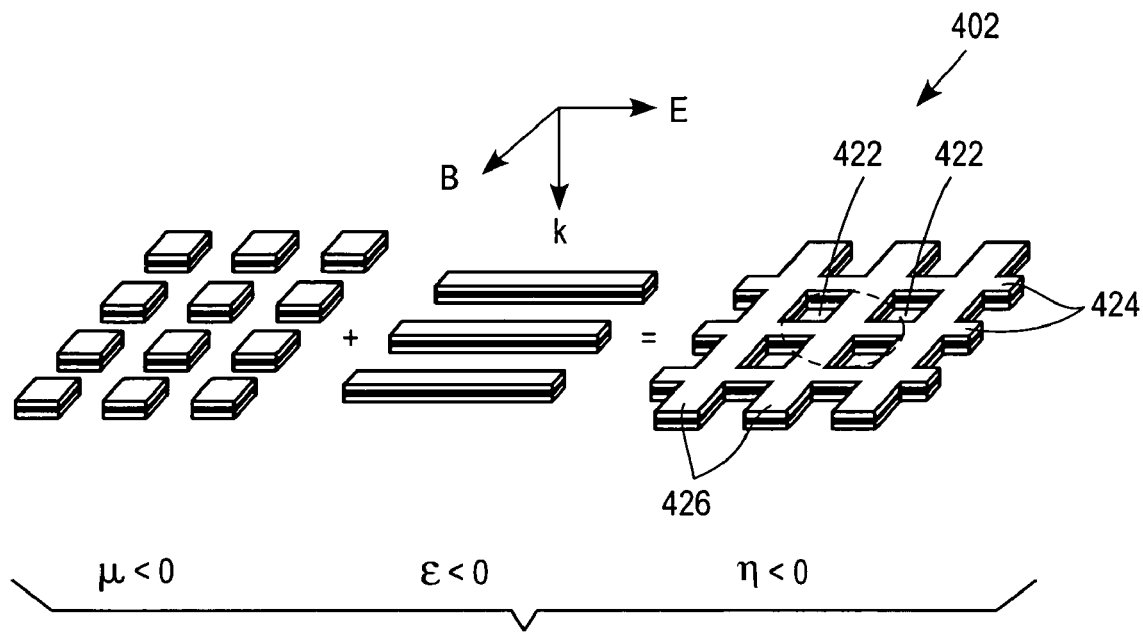
FIG. 5 depicts the electromagnetic response of a metamaterial structure including a metal-insulator-metal trilayer structure.

FIG. 5 illustrates the magnetic response of the metal-insulator-metal trilayer structure of the composite resonant EM structure 402. The composite resonant EM structure 402 comprises axially-extending portions 424 and circumferentially-extending portions 426 defining the holes 422. Square-shaped trilayer structures (left side) provide magnetic resonance, while elongated wire-like trilayers (middle) provide electric (plasmon) resonance. Combining these trilayers in the structure 402 shown on the right side of FIG. 5 produces a material that may possess both magnetic and electric (plasmon) resonance in the same frequency range.

Figure 6:
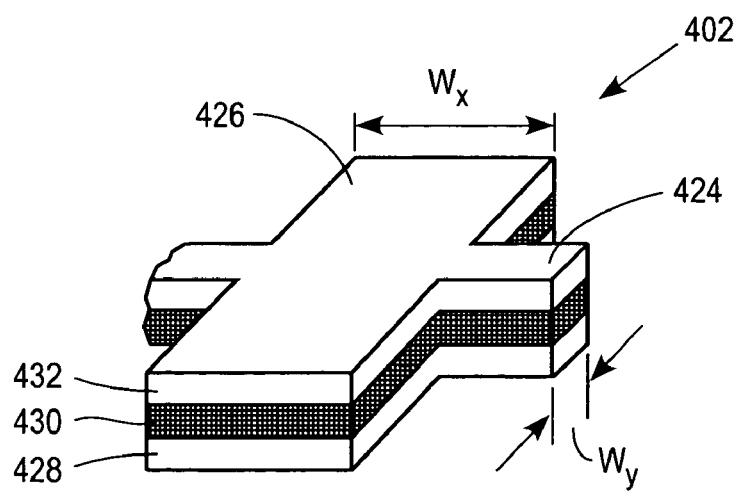
FIG. 6 is an enlarged view of a portion of the metamaterial structure shown at the right side in FIG. 5.

As shown in FIG. 6, the portions 424 have a width $W_y$, which is typically about 50 nm to about 150 nm, and the portions 426 have a width, $W_x$, which is typically about 150 nm to about 400 nm. The holes 422 can be circumferentially spaced from each other by a distance of about 600 µm, and axially spaced from each other by a distance of about 500 nm to about 600 nm, for example. The holes 422 can have various cross-sections including square and rectangular. The holes 422 can have exemplary length and width dimensions of about 300 nm and 500 nm, respectively.

As shown in FIG. 6, the embodiment of the composite resonant EM structure 402 includes a first metal layer 428, an insulator layer 430 on the first metal layer 428, and a second metal layer 432 on the insulator layer 430. The first metal layer 428 and second metal layer 432 can be composed of any metal that provides a sufficiently-high electrical conductivity. For example, the metal can have a low resistivity of less than about 5 µΩ·cm, such as about 4 µΩ·cm, 3 µΩ·cm, 2 µΩ·cm, or 1 µΩ·cm. The metal can be Ag, Au, Al or Cu, or alloys thereof, for example. The first metal layer 428 and second metal layer 432 can each have a thickness of about 20 nm to about 40 nm, for example.

The insulator layer 430 can be composed, for example, of $SiO_2$, $Al_2O_3$, polymers (e.g., polyimide). The insulator layer 430 can have a thickness of about 30 nm to about 50 nm, for example. Other metal/insulator material combinations can be used to form the layer stack of the fishnet structure.

The number of layers of the composite resonant EM structure 402 can be varied. For example, another exemplary stack can have the following layer arrangement: metal layer/insulator layer/metal layer/insulator layer/metal layer.

For the composite resonant EM structure 402 shown in FIGS. 5 and 6, the holes 422 can be formed in the structure after all three layers 428, 430 and 432 have been formed. In such embodiment, the holes 422 are aligned through all three layers and have a depth equal to the combined thickness of the first metal layer 428, insulator layer 430 and second metal layer 432.

In another embodiment, the holes 422 can extend through only a portion of the thickness of the composite resonant EM structure 402. For example, an insulator layer without holes can be formed over the first metal layer including holes, and then a second metal layer including holes can be formed on insulator layer. In the embodiment, the holes in the first metal layer are substantially aligned with the holes in the second metal layer. Depending on whether there is residual insulating material in the holes, the resonant frequency may be shifted as compared to structures with no residual insulator material in the holes.

The layers of the composite resonant EM structure 402 can be formed by various techniques, including by printing on a polymer (e.g., plastic) by nanoimprint lithography (NIL), dry etching, and by transfer to fiber in a roll-to-roll process.

In the metamaterial structures, the light guide confines and guides propagating light emitted by light sources. In the infrared regime, a ridge waveguide structure, such as low-index contrast planar waveguide comprised of InP/GaInAsP/InP or the like, can be used. Infrared wavelengths in the range of about 1.1 μm to 1.6 μm can be carried by silica fibers. In the optical regime, the waveguide can be made of a dielectric material, such as an optical fiber with a circular cross-section. In another embodiment, the light guide can be a line defect channel in a photonic bandgap crystal.

In the embodiment shown in FIG. 1, the light guide 104 is an optical fiber having a circular cross-section and the tapered portion 116 located within the composite resonant EM structure 102. The optical fiber can have an exemplary diameter of about 1 μm to about 50 μm, and the tapered portion 116 can have an exemplary diameter of about 0.3 μm to about 15 μm. The tapered portion 116 is configured to enhance coupling of light carried by the light guide 104 with the composite resonant EM structure 102.

In the metamaterial structures, the light guide can have a single piece structure, or can alternatively include two or more sections coupled together. The light guide can be a multi-mode fiber to carry light of frequency ω emitted by the light source 106 into the composite resonant EM structure 102, and to carry second and/or higher harmonics resulting from the upconversion process. The harmonics can be utilized for telecommunications applications.

In another embodiment, the light guide extends only to the outlet end 122 of the composite resonant EM structure 102. In this embodiment, light that exits the composite resonant EM structure 102 can be emitted into the air via a fiber to air coupler, such as for display or projection applications.

The composite resonant EM structure 102 has a sufficient length from the inlet end 124 to the outlet end 122 to effectively interact with the light emitted by the light source 106 before the light exits from the outlet end 124. For example, the composite resonant EM structure 102 can have a length of about 5 μm to about 150 μm.

In the embodiment shown in FIG. 1, the resonators 108 at opposed ends of the composite resonant EM structure 102 can be Bragg mirrors, for example.

In the embodiment shown in FIG. 1, the outer cladding 110 reflects light to enhance light containment within the composite resonant EM structure 102. The cladding 110 can be composed of any suitable material.

Embodiments of the metamaterial structures can include an optional gain medium, pumped medium or other mechanism for higher harmonic amplification.

The composite resonant EM structures have different optical properties than the components forming these structures. The composite resonant EM structures have electromagnetic material properties from their periodic resonant structures. The composite resonant EM structures have a desired resonant frequency to upconvert incident light having a frequency ω to a second harmonic 2ω (λ2), and/or higher harmonics (e.g., third harmonic 3ω(λ/3) or higher even or odd harmonics). The second harmonic can lie in the visible spectrum. For example, the second harmonic can lie anywhere within the range of about 400 nm to about 700 nm.

The incident light that is converted by the composite resonant EM structures can be substantially of a single wavelength, λ, i.e., substantially monolithic light, within the infrared range of about 1.1 μm to about 1.6 μm, for example. In exemplary embodiments, λ/2 can lie within the range of about 620 nm to 740 nm (red light), about 445 nm to 500 nm (blue light), or about 500 nm to 575 nm (green light). Accordingly, the resonant EM structures can upconvert a frequency of the incident light (e.g., infrared light) to visible light having a second harmonic frequency that corresponds to that of one of the colors of the visible spectrum, such as red, blue or green light.

In an exemplary embodiment of the metamaterial structures, the composite resonant EM structure has a light coupling efficiency of at least about 50%. The "light coupling efficiency" is defined herein as the percentage of the incident light intensity of frequency ω that couples into and excites the resonant mode of the resonant EM structure. Preferably, the composite resonant EM structure has a coupling efficiency of about 50% to about 70% for the resonant frequency. The non-linear material of the composite resonant EM structure can increase the conversion efficiency of the selected incident frequency to the resonant frequency of the resonant EM structure, such as from about 50% to about 70%.

The "quality factor," Q, is defined by: $E_{local}=QE_0$, where $E_{local}$ is the local electric field near the composite resonant EM structure, and $E_0$ is the electric field intensity in the incident light introduced into the composite resonant EM structure and converted to the resonant frequency. Embodiments of the metamaterial structure can provide a Q value>>1. That is, the local electric field $E_0$ can be substantially enhanced such that $E_{local}/E_0>>1$.

Figure 7:
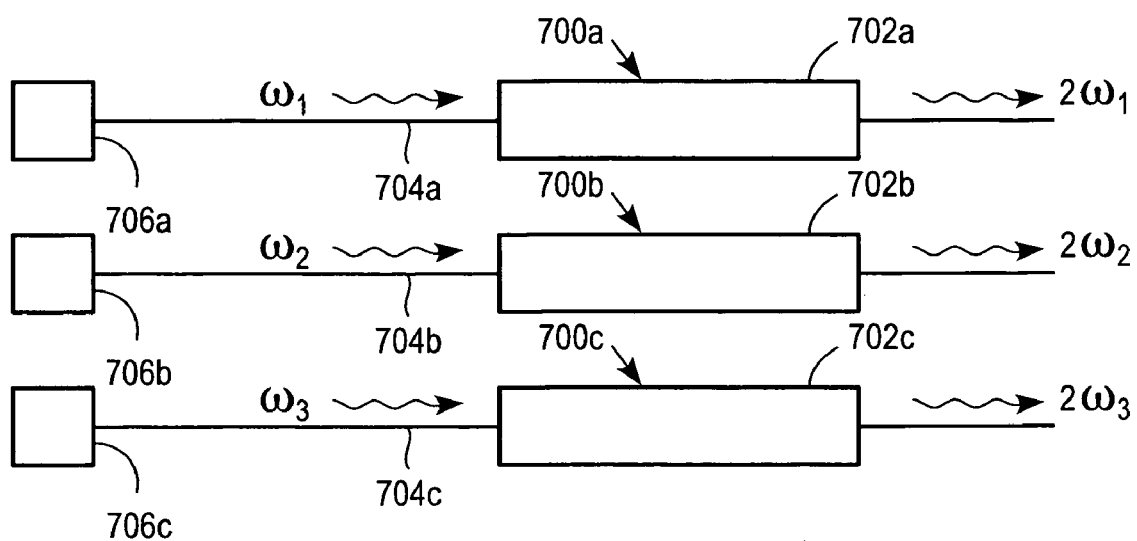
FIG. 7 illustrates another exemplary embodiment of a light processing system including three metamaterial structures and three associated light sources.

In the exemplary embodiment of a light processing system shown in FIG. 7, the metamaterial structures 700a, 700b and 700c comprise a first light guide 704a, a second light guide 704b and a third light guide 704c, respectively. The metamaterial structures 700a, 700b and 700c also comprise a first composite resonant EM structure 702a having a resonant frequency $\omega_{R1}$, a second composite resonant EM structure 702b having a resonant frequency $\omega_{R2}$, and a third composite resonant EM structure 702c having a resonant frequency $\omega_{R3}$. The first, second and third composite resonant EM structures 702a, 702b and 702c are arranged to interact with incident light propagating along the first, second and third light guides, 704a, 704b and 704c, respectively, to upconvert the light to first, second and third colors, respectively. The different colors can be produced simultaneously, or produced in some desired temporal pattern.

In the embodiment, the first, second and third composite resonant EM structures 702a, 702b and 702c can each have the same structure, such as that of the composite resonant EM structure 102 shown in FIG. 1, or the composite resonant EM structure 402 shown in FIGS. 4 to 6. The first, second and third light guides can each have the same structure, such as that of the light guide 104 shown in FIG. 1. In other embodiments, the composite resonant EM structures and light guides of the respective metamaterial structures can be different from each other.

As shown in FIG. 7, light sources 706a, 706b and 706c, are operatively associated with first, second and third composite resonant EM structures, 702a, 702b and 702c, respectively. For example, the light sources 706a, 706b and 706c can each emit monochromatic radiation having respective frequencies $\omega_1$, $\omega_2$ and $\omega_3$, which propagates along the respective light guides 704a, 704b and 704c, and is upconverted to second and/or higher harmonics, e.g., second harmonics $2\omega_1$, $2\omega_2$ and $2\omega_3$, by the first, second and third composite resonant EM structures, 702a, 702b and 702c. The second harmonics $2\omega_1$, $2\omega_2$ and $2\omega_3$ can be first, second and third colors, for example.

The colors that are produced by the metamaterial structure including three composite resonant EM structures can be selectively combined with each other to produce multiple different colors. For example, the additive primary colors red, green and blue can be produced by the metamaterial structure and then combined to produce the additive secondary colors. Green and blue light can be combined to produce cyan; red and blue light can be combined to produce magenta; green and red light can be combined to produce yellow; and red, green and blue light can be combined to produce white.

It is contemplated that embodiments of the metamaterial structures can be used to produce light for a variety of applications, such as light projection, displays and optoelectronic circuits (optical interconnects).

It is contemplated that the metamaterial structures can be used to provide a bright source of entangled, up-converted photons for quantum communication. To produce entangled photons in the visible range, a technique of two photons passing through a bi-refringement crystal can be used.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

The invention claimed is:

1. A metamaterial structure for light processing, comprising:
   a light guide; and
   a composite resonant electromagnetic (EM) structure including a plurality of metal nanoresonators and a nonlinear material, and having a resonant frequency, $\omega_R$, the composite resonant EM structure positioned to interact with light propagating along the light guide to upconvert a frequency, $\omega$, of the light to $\omega_R$, which generates second and/or higher harmonics of $\omega$.

2. The metamaterial structure of claim 1, wherein the composite resonant EM structure comprises a resonant periodic metamaterial structure.

3. The metamaterial structure of claim 2, wherein:
   the resonant periodic metamaterial structure comprises the plurality of metal nanoresonators; and
   the metal nanoresonators are (i) embedded in the nonlinear material, or (ii) disposed on a surface of the nonlinear material.

4. A metamaterial structure for light processing, comprising:
   a light guide; and
   a composite resonant electromagnetic (EM) structure having a resonant frequency, $\omega_R$, the composite resonant EM structure positioned to interact with light propagating along the light guide to upconvert a frequency, $\omega$, of the light to $\omega_R$, which generates second and/or higher harmonics of $\omega$, wherein the composite resonant EM structure comprises a multi-layer structure including a first metal layer, an insulator layer on the first metal layer, and a second metal layer on the insulator layer, the multi-layer structure has a periodic arrangement of aligned holes extending through at least the first and second metal layers.

5. A metamaterial structure for light processing, comprising:
   a light guide; and
   a composite resonant electromagnetic (EM) structure having a resonant frequency, $\omega_R$, the composite resonant EM structure positioned to interact with light propagating along the light guide to upconvert a frequency, $\omega$, of the light to $107_R$, which generates second and/or higher harmonics of $\omega$, wherein the light guide comprises an optical fiber having a tapered portion with reduced cross-sectional area, the tapered portion arranged within the composite resonant EM structure to enhance coupling of the light carried by the light guide with the composite resonant EM structure.

6. The metamaterial structure of claim 1, wherein the second harmonic is within the range of about 400 nm to about 700 nm.

7. A light processing system, comprising:
   a metamaterial structure according to claim 1; and
   a light source arranged to emit light which propagates along the light guide of the metamaterial structure.

8. A metamaterial structure for light processing, comprising:
   a first light guide;
   a second light guide;
   a third light guide;
   a first composite resonant electromagnetic (EM) structure having a first resonant frequency, $\omega_{R1}$, the first composite resonant EM structure positioned to interact with light propagating along the first light guide to upconvert a frequency, $\omega_1$, of the light to $\omega_{R1}$, which generates second and/or higher harmonics of $\omega_1$;
   a second composite resonant electromagnetic structure having a second resonant frequency, $\omega_{R2}$, the second composite resonant EM structure positioned to interact with light propagating along the second light guide to upconvert a frequency, $\omega_2$, of the light to $\omega_{R2}$, which generates second and/or higher harmonics of $\omega_2$; and
   a third composite resonant electromagnetic structure having a third resonant frequency, $\omega_{R3}$, the third composite resonant EM structure positioned to interact with light propagating along the third light guide to upconvert a frequency, $\omega_3$, of the light to $\omega_{R3}$, which generates second and/or higher harmonics of $\omega_3$.

9. The metamaterial structure of claim 8, wherein the second harmonic of each of $\omega_1$, $\omega_2$ and $\omega_3$ is within the range of about 400 nm to about 700 nm.

10. The metamaterial structure of claim 9, wherein the second harmonic of $\omega_1$, $\omega_2$ and $\omega_3$ corresponds to red, green and blue, respectively.

11. The metamaterial structure of claim 8, wherein the first second and third composite resonant EM structures each comprise a resonant periodic metamaterial structure.

12. The metamaterial structure of claim 11, wherein:
the resonant periodic metamaterial structure comprises a plurality of metal nanoresonators; and
the metal nanoresonators are (i) embedded in a non-linear material, or (ii) disposed on a surface of the non-linear material.

13. The metamaterial structure of claim 11, wherein the resonant periodic metamaterial structure comprises a multi-layer structure including a first metal layer, an insulator layer on the first metal layer, and a second metal layer on the insulator layer, the multi-layer structure has a periodic arrangement of aligned holes extending through at least the first and second metal layers.

14. The metamaterial structure of claim 8, wherein each of the first, second and third light guides comprises an optical fiber having a tapered portion with reduced cross-sectional area, the tapered portion arranged within the first, second and third composite resonant EM structures to enhance coupling of the light carried by the first, second and third light guides with the first, second and third composite resonant EM structures, respectively.

15. A light processing system, comprising:
a metamaterial structure according to claim 8;
a first light source arranged to emit light which propagates along the first light guide;
a second light source arranged to emit light which propagates along the second light guide; and
a third light source arranged to emit light which propagates along the third light guide.

16. A method of processing light with a metamaterial structure, the method comprising:
propagating light along a first light guide extending through a first composite resonant electromagnetic (EM) structure having a first resonant frequency, $\omega_{R1}$, wherein the first composite resonant EM structure interacts with light propagating along the first light guide to upconvert a frequency, $\omega_1$, of the light to $\omega_{R1}$, which generates second and/or higher harmonics of $\omega_1$; and
propagating light along a second light guide extending through a second composite resonant electromagnetic (EM) structure having a second resonant frequency, $\omega_{R2}$, wherein the second composite resonant EM structure interacts with light propagating along the second light guide to upconvert a frequency, $\omega_2$, of the light to $\omega_{R2}$, which generates second and/or higher harmonics of $\omega_2$.

17. The method of claim 16, further comprising:
propagating light along a third light guide extending through a third composite resonant electromagnetic (EM) structure having a third resonant frequency, $\omega_{R3}$, wherein the third composite resonant EM structure interacts with light propagating along the third light guide to upconvert a frequency, $\omega_3$, of the light to $\omega_{R3}$, which generates second and/or higher harmonics of $\omega_2$.

18. The method of claim 17, wherein the second harmonic of each of $\omega_1$, $\omega_2$ and $\omega_3$ is within the range of about 400 nm to about 700 nm.

19. The method of claim 17, wherein the second harmonic of $\omega_1$, $\omega_2$ and $\omega_3$ corresponds to red, green and blue light, respectively.

20. The method of claim 17, further comprising combining the second harmonics of at least two of the frequencies $\omega_1$, $\omega_2$ and $\omega_3$.

* * * * *

UNITED STATES PATENT AND TRADEMARK OFFICE
CERTIFICATE OF CORRECTION

| | | |
|---|---|---|
| PATENT NO. | : 7,515,330 B2 | Page 1 of 1 |
| APPLICATION NO. | : 11/699500 | |
| DATED | : April 7, 2009 | |
| INVENTOR(S) | : Alexandre M. Bratkovski | |

It is certified that error appears in the above-identified patent and that said Letters Patent is hereby corrected as shown below:

In column 8, line 24, in Claim 5, delete "$107_R$" and insert -- $\omega_R$ --, therefor.

In column 9, line 1, in Claim 11, delete "first" and insert -- first, --, therefor.

Signed and Sealed this

Thirteenth Day of October, 2009

David J. Kappos
*Director of the United States Patent and Trademark Office*